United States Patent
Lee et al.

(10) Patent No.: US 9,515,351 B2
(45) Date of Patent: Dec. 6, 2016

(54) NON-AQUEOUS ELECTROLYTE AND SECONDARY BATTERY COMPRISING THE SAME

(75) Inventors: Hochun Lee, Daejeon (KR); Jeong-Ju Cho, Daejeon (KR); Sujin Yoon, Gyeonggi-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/663,592

(22) PCT Filed: Jun. 10, 2008

(86) PCT No.: PCT/KR2008/003219
§ 371 (c)(1),
(2), (4) Date: Feb. 1, 2011

(87) PCT Pub. No.: WO2008/153296
PCT Pub. Date: Dec. 18, 2008

(65) Prior Publication Data
US 2011/0159377 A1  Jun. 30, 2011

(30) Foreign Application Priority Data
Jun. 11, 2007 (KR) ........................ 10-2007-0056724

(51) Int. Cl.
| | |
|---|---|
| H01M 10/0567 | (2010.01) |
| H01M 10/052 | (2010.01) |
| H01M 10/42 | (2006.01) |
| H01M 10/0525 | (2010.01) |
| H01M 10/0569 | (2010.01) |
| H01M 4/139 | (2010.01) |
| H01M 4/36 | (2006.01) |
| H01M 4/62 | (2006.01) |

(52) U.S. Cl.
CPC ......... *H01M 10/0567* (2013.01); *H01M 4/139* (2013.01); *H01M 4/366* (2013.01); *H01M 10/052* (2013.01); *H01M 10/0525* (2013.01); *H01M 10/0569* (2013.01); *H01M 10/4235* (2013.01); *H01M 4/62* (2013.01); *H01M 2300/0025* (2013.01); *H01M 2300/0037* (2013.01); *Y02E 60/122* (2013.01); *Y02P 70/54* (2015.11)

(58) Field of Classification Search
CPC ......... H01M 10/0567; H01M 10/052; H01M 10/4235; H01M 10/0525; H01M 10/0569; H01M 4/139; H01M 4/62; H01M 2300/0025; H01M 2300/0037; Y02P 70/54; Y02E 60/122
See application file for complete search history.

(56) References Cited

U.S. PATENT DOCUMENTS

| | | | |
|---|---|---|---|
| 6,479,192 B1 * | 11/2002 | Chung et al. | ................ 429/338 |
| 6,709,787 B2 | 3/2004 | Zhao et al. | |
| 6,939,644 B2 | 9/2005 | Aoshima et al. | |
| 7,223,502 B2 | 5/2007 | Onuki | |
| 7,691,537 B2 | 4/2010 | Kim | |
| 7,972,733 B2 * | 7/2011 | Lee et al. | ....................... 429/347 |
| 2002/0071915 A1 | 6/2002 | Schubert et al. | |
| 2002/0197537 A1 * | 12/2002 | Kim et al. | ................... 429/340 |
| 2003/0138703 A1 | 7/2003 | Yamaguchi et al. | |
| 2004/0146786 A1 | 7/2004 | Sato et al. | |
| 2005/0100795 A1 | 5/2005 | Utsugi et al. | |
| 2006/0194118 A1 | 8/2006 | Yew et al. | |
| 2006/0216612 A1 | 9/2006 | Jambunathan et al. | |
| 2006/0228626 A1 | 10/2006 | Kawashima et al. | |
| 2007/0072087 A1 * | 3/2007 | Yamamoto et al. | .......... 429/344 |
| 2007/0178379 A1 | 8/2007 | Tamura et al. | |
| 2007/0238025 A1 | 10/2007 | Onuki et al. | |

FOREIGN PATENT DOCUMENTS

| | | |
|---|---|---|
| CN | 1391705 A | 1/2003 |
| CN | 1507669 A | 6/2004 |
| CN | 1653641 A | 8/2005 |
| CN | 1819324 A | 8/2006 |
| CN | 1822423 A | 8/2006 |
| EP | 0683537 A1 | 11/1995 |
| EP | 0823744 A2 | 2/1998 |
| EP | 1498979 A1 | 1/2005 |
| JP | 8-045545 A | 2/1996 |
| JP | 2003092137 A | 3/2003 |
| JP | 2003168479 A | 6/2003 |
| JP | 2003-217656 A | 7/2003 |
| JP | 2003-331921 A | 11/2003 |
| JP | 2004-319317 A | 11/2004 |
| JP | 2005-038722 A | 2/2005 |
| JP | 2006086058 A | 3/2006 |
| JP | 2006-245001 A | 9/2006 |
| JP | 2007-005242 A | 1/2007 |
| JP | 2007128765 A | 5/2007 |

(Continued)

OTHER PUBLICATIONS

International Search Report, PCT/KR2008/003219, dated Aug. 25, 2008.
"Lithium-ion Battery Technology—Materials/Manufacturing Technology & Safety Evaluation," Science & Technology, Jun. 24, 2010, pp. 276-277.
Shen Shui Zhang, "A review on electrolyte additives for lithium-ion batteries." Journal of Power Sources 162 (2006) pp. 1379-1394.

*Primary Examiner* — Eugenia Wang
(74) *Attorney, Agent, or Firm* — Lerner, David, Littenberg, Krumholz & Mentlik, LLP

(57) ABSTRACT

Disclosed is a secondary battery including an electrolyte and/or an electrode, the electrolyte including an electrolyte salt and an electrolyte solvent, i) a cyclic carbonate compound substituted with at least one halogen element; and ii) a compound containing a vinyl group in a molecule thereof, and the electrode including a solid electrolyte interface (SEI) layer partially or totally formed on the surface thereof by electrical reduction of the two compounds.

5 Claims, No Drawings

(56) References Cited

FOREIGN PATENT DOCUMENTS

| JP | 2008166271 A | 7/2008 |
| KR | 20020086068 A | 11/2002 |
| KR | 20040005954 | 1/2004 |
| KR | 20070006253 | 1/2007 |
| KR | 20080058197 A | 6/2008 |
| WO | 2006077763 A1 | 7/2006 |
| WO | 2006137224 A1 | 12/2006 |
| WO | 2007043624 A1 | 4/2007 |
| WO | WO 2008/023951 A1 * | 2/2008 |

* cited by examiner

NON-AQUEOUS ELECTROLYTE AND SECONDARY BATTERY COMPRISING THE SAME

CROSS REFERENCE TO RELATED APPLICATIONS

The present application is a national phase entry under 35 U.S.C. §371 of International Application No. PCT/KR2008/003219, filed Jun. 10, 2008, published in English, which claims the benefit of Korean Patent Application No. 10-2007-0056724, filed Jun. 11, 2007. The disclosures of said applications are incorporated by reference herein.

TECHNICAL FIELD

The present invention relates to a non-aqueous electrolyte and a secondary battery including the same. More particularly, the present invention relates to a non-aqueous electrolyte capable of simultaneously improving various characteristics of a battery, such as a lifetime characteristic, high temperature performance, etc., and a secondary battery including the same.

BACKGROUND ART

Recently, there has been increasing interest in energy storage technology. Electrochemical devices have been widely used as energy sources in portable phones, camcorders, notebook computers, PCs and electric cars, resulting in intensive research and development. In this regard, electrochemical devices are subjects of great interest. Particularly, development of rechargeable secondary batteries has been the focus of attention.

Among the currently used secondary batteries, lithium secondary batteries, developed in early 1990's, generally have an average discharge voltage of about 3.6 to 3.7V, and drive voltage and energy density higher than those of conventional batteries (such as Ni-MH batteries, Ni—Cd batteries, etc.), and thus they are spotlighted in the field of secondary batteries.

However, as the fields where lithium secondary batteries are applied are gradually expanded, battery characteristics have been required to be improved from the standpoints of high-rate capability, cyclability, stability, etc. For example, high-rate capability refers to an indicator of the capability in high speed charge/discharge at high current, and is regarded as an important issue in the field requiring high power, such as a power tool, an HEV (Hybrid Electric Vehicle), etc. However, there is a problem in that lithium secondary batteries using a non-aqueous electrolyte have lithium ion conductivity lower than those of conventional batteries using an aqueous electrolyte (such as Ni-MH batteries, Ni—Cd batteries, etc.).

Also, a non-aqueous electrolyte used for secondary batteries usually includes an electrolyte solvent and an electrolyte salt. Herein the electrolyte solvent may be decomposed on the surface of an electrode during charge/discharge of a battery, or may break down an anode structure through co-intercalation between carbonaceous material anode layers, thereby obstructing the stability of the battery. It is known that such a problem can be solved by a solid electrolyte interface (hereinafter, referred to as SET) layer formed on an anode surface by reduction of an electrolyte solvent during an initial charge of a battery, but in general, the SEI layer is insufficient to continuously protect an anode. Accordingly, the above mentioned problem may continuously occur during charge/discharge of a battery, thereby causing a problem in that the lifetime characteristic of the battery is degraded. Especially, when a battery is driven or left at high temperatures, the SEI layer is subject to break-down by increasing electrochemical and thermal energy with the passage of time due to its thermal instability. Accordingly, at high temperatures, there is a problem in that a battery characteristic is more significantly degraded, and particularly, gas (such as $CO_2$) is continuously generated by the break-down of an SEI layer, the decomposition of an electrolyte, etc., thereby increasing the internal pressure and thickness of the battery.

In order to solve the above described problems, EU 683537 and JP 1996-45545 disclosed methods of using vinylene carbonate (hereinafter, referred to as VC) as an electrolyte additive for forming an SEI layer on an anode surface. However, the SEI layer formed by VC cannot improve high-rate capability and high temperature performance of a battery, because the SEI layer has a somewhat high resistance and is subject to break-down at high temperatures.

As described above, in a prior art, when a certain compound is added in an electrolyte in order to improve battery characteristics, some characteristics can be improved while other characteristics may be degraded or may be maintained as it is.

DISCLOSURE OF THE INVENTION

Therefore, the present invention has been made in view of the above-mentioned problems. It is an object of the present invention to provide an electrolyte including both a halogen-substituted cyclic carbonate compound and a compound containing a vinyl group in a molecule thereof, so as to optimize the properties of an SEI layer formed on an anode surface, such as stability and lithium ion conductivity, and to simultaneously improve various battery characteristics, such as a lifetime characteristic, high temperature performance.

In accordance with an aspect of the present invention, there is provided an electrolyte and a secondary battery including the same, the electrolyte including an electrolyte salt and an electrolyte solvent, and i) a cyclic carbonate compound substituted with at least one halogen element; and a compound containing a vinyl group in a molecule thereof, which is represented by Formula 1.

In accordance with another aspect of the present invention, there is provided an electrode and a secondary battery including the same, the electrode including a solid electrolyte interface (SEI) layer partially or totally formed on the surface thereof, the SEI layer containing a cyclic carbonate compound substituted with at least one halogen element and a vinyl group containing compound represented by Formula 1, or a resultant material from a chemical reaction thereof.

[Formula 1]

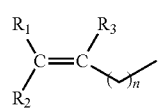

In Formula 1, n represents 0 to 6; each of $R_1$, $R_2$, and $R_3$ independently represents a hydrogen atom, a halogen atom, $C_1$~$C_6$ alkyl group, $C_3$~$C_{12}$ cycloalkyl group, $C_6$~$C_{12}$ aryl group, or $C_2$~$C_6$ alkenyl group, the group being substituted/unsubstituted with a halogen atom or a cyano group.

Hereinafter, the present invention will be described in detail.

In general, during the first charge process of a secondary battery, on the surface of an anode active material, a solid electrolyte interface (SEI) layer is formed by reduction decomposition of an electrolyte (for example, an electrolyte salt and/or an electrolyte solvent), and partial consumption of the amount of reversible lithium. An ideal SEI layer is insoluble in an electrolyte, is an electronic insulator, is conductive to ions (for example, $Li^+$), is stable without being broken down at continuous charge/discharge, and can be quickly reproduced, even after breakdown.

Various researches on improvement of properties of an SEI layer by using various electrolyte additives capable of forming the SEI layer have been conventionally conducted, but in most of them, it was impossible to improve both the stability of an SEI layer and the lithium ion conductivity of the SEI layer. For example, the use of a compound capable of forming a strong and dense SEI layer as an electrolyte additive improves the stability of an SEI layer, while reducing ion conductivity by increasing the resistance in the movement of lithium ions toward an anode active material by increase of the thickness of the SEI layer. On the other hand, the use of an electrolyte additive capable of improving ion conductivity may degrade the stability of a formed SEI layer. In other words, in an SEI layer, the stability is inconsistent with lithium ion conductivity.

The inventors of the present invention found that when a combination of two compounds capable of forming an SEI layer, that is, a halogen-substituted cyclic carbonate compound and a vinyl group containing compound (which are inconsistent each other from the standpoint of the stability and lithium ion conductivity) is used as an electrolyte component, a synergy effect is achieved, thereby simultaneously improving various characteristics of a battery.

Accordingly, in the present invention, the above described combination of a halogen-substituted cyclic carbonate compound and a vinyl group containing compound represented by Formula 1 is used as an electrolyte component, thereby simultaneously optimizing the properties of an SEI layer formed on an anode surface, such as stability and lithium ion conductivity.

Actually, the presumption on the improvement of various battery characteristics, which is achieved by the combination of the above mentioned two compounds, is as follows.

An SEI layer formed by electrical reduction of a halogen-substituted cyclic carbonate compound is thin or porous, and thus may be easily broken down with continuous charge/discharge. Herein, such an SEI layer portion lacking stability may be stronger and denser by superposition or cross-linking/repeated polymerization of a vinyl group containing compound, which is achieved through electrical reduction. Accordingly, even when charge/discharge is continuously repeated, the physical and structural stability of the SEI layer is maintained so that the lifetime characteristic of a battery can be maintained.

Also, the vinyl group containing compound represented by Formula 1 includes a polymerizable functional group (i.e. a vinyl group) existing in a molecule thereof, and thus can have high stability by forming a relatively thick and dense layer through a chain polymerization reaction of such a vinyl group. However, since most components of the formed SEI layer are non-polar hydrocarbon-based, lithium ion conductivity is significantly reduced. In general, the ion conductivity is affected by polar groups existing in an SEI layer, especially an increase of the polar groups. Accordingly, when a polar (halogen) group from the cyclic carbonate compound is attached to such a non-polar SEI layer, it is possible to achieve high lithium ion conductivity despite thickness and density of the SEI layer.

Further, in the halogen-substituted cyclic carbonate compound, the reduction voltage is decreased by electrical effects (in the case of a half-cell, the reduction voltage is increased), thereby facilitating the reduction reaction at an anode. Thus, an SEI layer, even broken down at high temperature storage, may be quickly reproduced at low voltage. Accordingly, a drop in the capacity of a battery may be minimized by a drop in the amount of irreversible lithium consumed by charge/discharge of the battery or reproduction of an SEI layer, and battery characteristics, such as a lifetime characteristic, high temperature performance, etc. may be simultaneously improved.

A non-aqueous electrolyte of the present invention includes both a halogen-substituted cyclic carbonate compound and a compound containing a vinyl group in a molecule thereof, the vinyl group containing compound being represented by Formula 1.

The halogen-substituted cyclic carbonate compound includes at least one halogen group, such as F, Cl, Br, I, etc., in a cyclic carbonate molecule. Herein, since the compound forms an SEI layer by reduction through a ring opening reaction, few by-products, besides reduced materials forming the SEI layer, are generated. Also, the formed SEI layer is a passivation layer which is not subject to oxidation due to an electron-withdrawing operation of halogen, and thus may have high stability in a long-term cycle.

Non-limiting examples of the halogen-substituted cyclic carbonate compound include 3-fluoro ethylene carbonate, 3-chloro ethylene carbonate, 4-fluoro methyl ethylene carbonate, trifluoro methyl ethylene carbonate, cis or trans-3, 4-difluoro ethylene carbonate, etc., but the present invention is not limited thereto. Also the compounds may be used alone or in combination.

Meanwhile, there is no particular limitation in the vinyl group containing compound represented by Formula 1 that may be used in the present invention, as long as the compound includes a vinyl group in a molecule thereof. However, the case where a vinyl group exists within a cyclic ring is not included in the present invention. Preferably, the vinyl group is positioned at a terminal portion within a molecule. When the vinyl group is positioned at the terminal portion as described above, a polymerization may be more easily carried out during an SEI layer forming process.

The compound containing a vinyl group at a terminal portion within a molecule may be an acrylate-based compound, a sulfonate-based compound, or an ethylene carbonate-based compound containing a vinyl group positioned at a terminal portion within a molecule thereof. The compounds may be used alone or in combination.

The acrylate-based compound containing a vinyl group is a compound including at least one acrylic group ($CH_2=CH_2-CO_2-$) and non-limiting examples of the compound include tetraethyleneglycol diacrylate, Polyethylene glycol diacrylate (molecular weight of 50~20,000), Bisphenol A ethoxylated diacrylate (molecular weight of 100~10,000), 1,4-butanediol diacrylate, 1,6-hexandiol diacrylate, TriMethylolPropane TriAcrylate, DiTriMethylolPropane TetraAcrylate, DiPentaErythritol HexaAcrylate, Tris[2-(acryloyloxy)ethyl]isocyanurate, etc.

Also, the sulfonate-based compound containing a vinyl group may be represented by Formula 2. Non-limiting examples of the compound include propenyl methansulfonate, ethenyl benzenesulfonate, propenyl propensulfonate, propenyl cyanoethansulfonate, allyl prop-2-ene-1-sulfonate, etc.

[Formula 2]

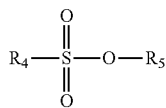

In formula 2, at least one of $R_4$ and $R_5$ includes a vinyl group, and the other one represents a hydrogen atom, a halogen atom, a $C_1$~$C_6$ alkyl group, a $C_6$~$C_{12}$ aryl group, a $C_2$~$C_6$ alkenyl group, or a halogen derivative thereof.

Also, the ethylene carbonate based compound containing a vinyl group may be represented by Formula 3. Non-limiting examples of the compound include 3-vinyl ethylene carbonate, 3-allyl ethylene carbonate, (2-oxo-1,3-dioxolan-4-yl)methyl prop-1-ene-1-sulfonate, or a derivative thereof, etc.

[Formula 3]

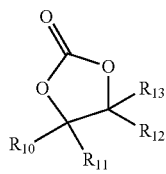

In Formula 3, at least one of $R_{10}$ to $R_{13}$ includes a vinyl group, and each of the others independently represents a hydrogen atom, a halogen atom, a $C_1$~$C_6$ alkyl group, a $C_6$~$C_{12}$ aryl group, a $C_2$~$C_6$ alkenyl group, a sulfonate group, or a halogen derivative thereof.

In the electrolyte of the present invention, the contents of the halogen-substituted cyclic carbonate compound and the compound containing a vinyl group at a terminal portion within a molecule may be adjusted according to the required extent in improvement of battery characteristics. The content ratio (weight ratio) of the compounds may be 1:0.1~1:10, preferably 1:0.2~1:4, and more preferably 1:0.4~1:2. If one of the compounds is excessively used, it may be difficult to simultaneously improve the stability and lithium ion conductivity in a formed SEI layer.

Meanwhile, each of the two above mentioned compounds may be included in an amount of 0.05 to 10 parts by weight, based on 100 parts by weight of an electrolyte, and the total content of the compounds may be present in an amount of 0.1 to parts by weight, based on 100 parts by weight of the electrolyte.

If the content of the halogen-substituted cyclic carbonate compound is less than 0.05 parts by weight, a battery characteristic improving effect by the compound is insignificant, and on the other hand, if the content is greater than 10 parts by weight, the amount of irreversible lithium may be increased, thereby degrading the characteristics of a battery. Also, if the content of the vinyl group containing compound is less than 0.01 parts by weight, a battery characteristic improving effect is insignificant, and on the other hand, if the content is greater than 5 parts by weight, there is a problem such as gas generation and impedance increase.

An electrolyte for a battery in which the compounds are added includes conventional electrolyte components known in the art, such as an electrolyte salt and an electrolyte solvent.

The electrolyte salt may include a combination of (i) a cation selected from the group including $Li^+$, $Na^+$, and $K^+$ and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, but the present invention is not limited thereto. Such electrolyte salts may be used alone or in combination. Particularly, a lithium salt is preferred.

Examples of the electrolyte solvent may include cyclic carbonates, linear carbonates, lactones, ethers, esters, acetonitriles, lactams, ketones, etc.

Particular examples of the cyclic carbonates include ethylene carbonate (EC), propylene carbonate (PC), butylene carbonate (BC), fluoroethylene carbonate (FEC) or the like. Particular examples of the linear carbonates include diethyl carbonate (DEC), dimethyl carbonate (DMC), dipropyl carbonate (DPC), ethylmethyl carbonate (EMC), methyl propyl carbonate (MPC), or the like. Particular examples of the lactone include gamma-butyrolactone (GBL). Particular examples of the ether include dibutyl ether, tetrahydrofuran, 2-methyltetrahydrofuran, 1,4-dioxane, 1,2-dimethoxyethane, 1,2-diethoxyethane, or the like. Particular examples of the ester include methyl formate, ethyl formate, propyl formate, methyl acetate, ethyl acetate, propyl acetate, methyl propionate, ethyl propionate, butyl propionate, methyl pivalate, or the like. Also, examples of the lactam include N-methyl-2-pyrrolidone (NMP); and examples of the ketone include polymethylvinyl ketone. Also, halogen derivatives thereof may be used, and are not limited to the above exemplified electrolyte solvents. Such electrolyte solvents may be used alone or in combination.

Also, the present invention provides an electrode (preferably an anode) including an SEI layer partially or totally formed on the surface thereof, the SEI layer containing a cyclic carbonate compound substituted with at least one halogen element and a vinyl group containing compound represented by Formula 1, or a resultant material from the chemical reaction thereof.

In the electrode, when at least one charge/discharge cycle is carried out by using an electrolyte including the cyclic carbonate compound substituted with at least one halogen element and the vinyl group containing compound, the two compounds within the electrolyte, together with reversible lithium ions, may be formed on the surface of an electrode active material. Or else, before a battery is configured, the two compounds may be coated on the surface of an electrode active material or a preformed electrode, or may be used as electrode materials. Also, before assembling a unit cell, an electrode is subjected to electrical reduction while the electrode is dipped into an electrolyte including the compounds, so as to obtain a battery including the electrode having a preliminarily formed SEI film thereon.

Herein, a cyclic carbonate compound substituted with at least one halogen element and a vinyl group containing compound are as mentioned above, and also, an electrode may be coated or manufactured in a conventional manner.

Also, an electrode of the present invention may be manufactured by a conventional method known in the art. In one embodiment of such conventional methods, electrode slurry is prepared by mixing and agitating an electrode active material and a dispersion medium optionally with a binder, a conductive agent and a dispersant, and then the slurry is applied (coated) onto a metallic current collector, followed by compressing and drying.

Herein, as the electrode materials, such as a dispersion medium, a binder, a conductive agent, and a dispersant, any conventional materials known in the art may be used. The binder and the conductive agent may be used in an amount of 1 to 10 parts by weight and 1 to 30 parts by weight, respectively, based on the weight of the electrode active material.

As the anode active material, any type of anode active material that may be used in an anode of a conventional secondary battery may be used. Non-limiting examples of the anode active material may include lithium-absorbing/discharging materials, such as lithium metal, lithium alloy, carbon, petroleum coke, activated carbon, graphite, carbon fiber, etc. In addition, a metal oxide, such as $TiO_2$, $SnO_2$, etc., which can absorb and discharge lithium ions and has a potential vs. lithium potential of less than 2V may be used. Particularly, a carbonaceous material, such as graphite, carbon fiber, activated carbon, etc. is preferred.

Examples of the cathode active material may include, a lithium transition metal composite oxide such as $LiM_xO_y$, (M=Co, Ni, Mn, $Co_aNi_bMn_c$) (for example, lithium manganese composite oxide such as $LiMn_2O_4$, lithium nickel oxide such as $LiNiO_2$, lithium cobalt oxide such as $LiCoO_2$, oxides substituted with other transition metals, lithium containing vanadium oxide, etc), chalcogenide (for example, manganese dioxide, titanium disulfide, molybdenum disulfide, etc.), etc. Preferably, the examples include $LiCoO_2$, $LiNiO_2$, $LiMnO_2$, $LiMn_2O_4$, $Li(Ni_aCO_bMn_c)O_2$ (0<a<1, 0<b<1, 0<c<1, a+b+c=1), $LiNi_{1-y}CO_yO_2$, $LiCO_{1-y}Mn_yO_2$, $LiNi_{1-y}Mn_yO_2$ (provided that, 0≤Y<1), $Li(Ni_aCO_bMn_c)O_4$ (0<a<2, 0<b<2, 0<c<2, a+b+c=2), $LiMn_{2-z}Ni_zO_4$, $LiMn_{2-z}CO_zO_4$ (provided that, 0<Z<2), $LiCoPO_4$, $LiFePO_4$, or a mixture thereof.

The present invention provides a secondary battery which includes an electrolyte including both the halogen-substituted cyclic carbonate compound and the compound containing a vinyl group at a terminal portion within a molecule, and/or an electrode including an SEI layer partially or totally formed on the surface thereof, the SEI layer being formed by electrical reduction of the compounds. Preferably, the present invention provides a secondary battery which includes a separator, a cathode, an anode, and an electrolyte; the anode including a solid electrolyte interface (SEI) layer partially or totally formed on the surface thereof by electrical reduction of a cyclic carbonate compound substituted with halogen element and a compound containing a vinyl group positioned at a terminal portion within a molecule; and/or the electrolyte including the compounds.

Non-limiting examples of the secondary battery include a lithium metal secondary battery, a lithium ion secondary battery, a lithium polymer secondary battery, or a lithium ion polymer secondary battery.

A secondary battery of the present invention may be manufactured by a conventional method known in the art. In one embodiment of such conventional methods, a separator is inserted between an anode and a cathode, and assembled, and an electrolyte prepared according to the present invention is injected.

There is no particular limitation in the separator that may be used in the present invention, preferably the separator is a porous material Non-limiting examples of the separator that may be used include a polypropylene-based, polyethylene-based, polyolefin-based porous separator.

There is no particular limitation in the outer shape of the secondary battery. The secondary battery may be a cylindrical battery using a can, a prismatic battery, a pouch-type battery or a coin-type battery.

BEST MODE FOR CARRYING OUT THE INVENTION

Reference will now be made in detail to the preferred embodiments of the present invention. However, the following examples are illustrative only, and the scope of the present invention is not limited thereto.

EXAMPLE 1

1M $LiPF_6$ solution dissolved in a mixed solvent of ethylene carbonate (EC): diethyl carbonate (DEC) (3:7 on the volume basis) was prepared, and 2 parts by weight of 3-fluoro ethylene carbonate and 2 parts by weight of tetraethyleneglycol diacrylate were added, based on 100 parts by weight of the solution, to obtain an electrolyte.

$LiCoO_2$, was used as a cathode active material and artificial graphite was used as an anode active material to provide a pouch-like battery of 800 mAh in a conventional manner. The electrolyte obtained as described above was also used in the battery.

EXAMPLE 2

An electrolyte and a battery were obtained in the same manner as described in Example 1, except that tetraethyleneglycol diacrylate was used in an amount of 4 parts by weight, instead of 2 parts by weight.

EXAMPLE 3

An electrolyte and a battery were obtained in the same manner as described in Example 1, except that 2 parts by weight of allyl prop-2-ene-1-sulfonate was used, instead of 2 parts by weight of tetraethyleneglycol diacrylate.

EXAMPLE 4

An electrolyte and a battery were obtained in the same manner as described in Example 1, except that 2 parts by weight of vinyl ethylene carbonate was used, instead of 2 parts by weight of tetraethyleneglycol diacrylate.

EXAMPLE 5

An electrolyte and a battery were obtained in the same manner as described in Example 1, except that 2 parts by weight of 3,4-difluoro ethylene carbonate and 2 parts by weight of allyl prop-2-ene-1-sulfonate were used, instead of 3-fluoro ethylene carbonate and tetraethyleneglycol diacrylate.

COMPARATIVE EXAMPLE 1

An electrolyte and a battery were obtained in the same manner as described in Example 1, except that 2 parts by weight of vinyl carbonate was used, instead of 2 parts by weight of tetraethyleneglycol diacrylate.

COMPARATIVE EXAMPLE 2

An electrolyte and a battery were obtained in the same manner as described in Example 1, except that 2 parts by weight of 3-fluoro ethylene carbonate was used alone, instead of 3-fluoro ethylene carbonate and tetraethyleneglycol diacrylate.

COMPARATIVE EXAMPLE 3

An electrolyte and a battery were obtained in the same manner as described in Example 1, except that 2 parts by weight of 3,4-difluoro ethylene carbonate was used alone, instead of 3-fluoro ethylene carbonate and tetraethyleneglycol diacrylate.

COMPARATIVE EXAMPLE 4

An electrolyte and a battery were obtained in the same manner as described in Example 1, except that 2 parts by weight of tetraethyleneglycol diacrylate was used alone, instead of 3-fluoro ethylene carbonate and tetraethyleneglycol diacrylate.

COMPARATIVE EXAMPLE 5

An electrolyte and a battery were obtained in the same manner as described in Example 1, except that 2 parts by weight of allyl prop-2-ene-1-sulfonate was used alone, instead of 3-fluoro ethylene carbonate and tetraethyleneglycol diacrylate.

COMPARATIVE EXAMPLE 6

A non-aqueous electrolyte and a battery were obtained in the same manner as described in Example 1, except that 2 parts by weight of vinyl ethylene carbonate was used alone, instead of 3-fluoro ethylene carbonate and tetraethyleneglycol diacrylate.

COMPARATIVE EXAMPLE 7

An electrolyte and a secondary battery including the electrolyte were obtained in the same manner as described in Example 1, except that any compound is not added in the electrolyte.

EXPERIMENTAL EXAMPLE 1

Test on the Lifetime

Each of the batteries obtained from Examples 1 to 5 and Comparative Examples 1 to 7 was charged/discharged to/from 0.8 C/0.5 C 300 times, and the capacity maintenance ratio to the initial capacity was tested. Table 1 shows the results.

It can be seen from the above experimental results that when a combination of a halogen-substituted cyclic carbonate compound and a vinyl group containing compound is used as an electrolyte additive, a lifetime improving effect is enhanced, as compared to the case where each of the compounds is used alone (see Table 1).

EXPERIMENTAL EXAMPLE 2

Change in Thickness During Storage at High Temperature

The temperature of each of the batteries obtained from Examples 1 to 5 and Comparative Examples 1 to 7 was raised from room temperature up to 90° C. for 1 hour, and then was maintained at 90° C. for 4 hours. Then, the change in battery thickness was tested in real time by lowering the temperature at 90° C. for 1 hour. Table 1 shows the results. For reference, the increase in battery thickness is in proportion to the amount of gas generated within the battery.

It can be seen from the above experimental results that when a conventional electrolyte is used without an electrolyte additive, or a halogen-substituted cyclic carbonate compound is solely used as an electrolyte additive, the battery thickness significantly increases by gas generation during storage of the battery at high temperature. On the other hand, it can be seen that when a combination of a halogen-substituted cyclic carbonate compound and a vinyl group containing compound is used as an electrolyte additive, the battery thickness increase by gas generation during storage of the battery at high temperature is significantly reduced (see FIG. 1).

For reference, in the case of the battery obtained from Comparative Example 1 in which a conventional vinyl group containing compound (vinylene carbonate), instead of the vinyl group containing compound represented by Formula 1, was used in combination with a halogen-substituted cyclic carbonate compound as an electrolyte additive, it was determined that when the battery was stored at a high temperature, its thickness was significantly increased, as compared other batteries.

TABLE 1

| | Electrolyte additive | Capacity maintenance ratio (%) | Increase of thickness (mm) |
|---|---|---|---|
| Exp. 1 | 3-fluoro ethylene carbonate 2 parts by weight tetraethyleneglycol diacrylate 2 parts by weight | 92 | 0.21 |
| Exp. 2 | 3-fluoro ethylene carbonate 2 parts by weight tetraethyleneglycol diacrylate 4 parts by weight | 80 | 0.18 |
| Exp. 3 | 3-fluoro ethylene carbonate 2 parts by weight ally prop-2-ene-1-sulfonate 2 parts by weight | 94 | 0.18 |
| Exp. 4 | 3-fluoro ethylene carbonate 2 parts by weight vinyl ethylene carbonate 2 parts by weight | 93 | 0.23 |
| Exp. 5 | 3,4-difluoro ethylene carbonate 2 parts by weight ally prop-2-ene-1-sulfonate 2 parts by weight | 90 | 0.35 |
| Comp. Exp. 1 | 3-fluoro ethylene carbonate 2 parts by weight vinylene carbonate 2 parts by weight | 87 | 1.75 |
| Comp. Exp. 2 | 3-fluoro ethylene carbonate 2 parts by weight | 78 | 0.98 |
| Comp. Exp. 3 | 3,4-difluoro ethylene carbonate 2 parts by weight | 75 | 1.16 |
| Comp. Exp. 4 | tetraethyleneglycol diacrylate 2 parts by weight | 64 | 0.11 |
| Comp. Exp. 5 | ally prop-2-ene-1-sulfonate 2 parts by weight | 69 | 0.08 |
| Comp. Exp. 6 | vinyl ethylene carbonate 2 parts by weight | 72 | 0.13 |
| Comp. Exp. 7 | None | 62 | 0.46 |

EXPERIMENTAL EXAMPLE 3

Test on Physical Properties of an Anode SEI Layer

Coin-type half cells were obtained by using electrolytes prepared from Examples 1 to 4, and Comparative Examples 2, and 4 to 7, artificial graphite as a cathode, and lithium foil as an anode in a conventional manner. Each of the obtained coin-like half cells was subjected to three charge/discharge cycles under 0.2 C at 23° C., each cell was disassembled, and then the anode was collected from each cell in a discharged state. The anode was analyzed by DSC (differential scanning calorimetry), and the heat emission peak temperature was noted in Table 2.

For reference, it is generally thought that the heat emission peak temperature is the result of the thermal degradation of the SEI film on the surface of the anode.

According to the test results, batteries obtained from Comparative Examples 2 to 6 in which a single additive component was used showed different heat generation initiation temperatures of anodes. It can be seen from the above experimental results that the thermal characteristics of SEI layers vary depending on the kind of the additive used in each of the electrolytes.

Meanwhile, each of the batteries obtained from Examples 1 to 4 in which a cyclic carbonate compound substituted with a halogen element and a vinyl group containing compound represented by Formula 1 were used in combination as an electrolyte additive showed the mean value of the heat generation initiation temperatures obtained by using each compound alone. It can be seen from the above experimental results that both the halogen-substituted cyclic carbonate compound and the vinyl group containing compound participate in the formation of the SEI layer.

TABLE 2

| | Electrolyte additive | Heat generation initiation temperature (° C.) |
|---|---|---|
| Exp. 1 | 3-fluoro ethylene carbonate 2 parts by weight tetraethyleneglycol diacrylate 2 parts by weight | 108 |
| Exp. 2 | 3-fluoro ethylene carbonate 2 parts by weight tetraethyleneglycol diacrylate 4 parts by weight | 111 |
| Exp. 3 | 3-fluoro ethylene carbonate 2 parts by weight ally prop-2-ene-1-sulfonate 2 parts by weight | 97 |
| Exp. 4 | 3-fluoro ethylene carbonate 2 parts by weight vinyl ethylene carbonate 2 parts by weight | 98 |
| Comp. Exp. 2 | 3-fluoro ethylene carbonate 2 parts by weight | 93 |
| Comp. Exp. 4 | tetraethyleneglycol diacrylate 2 parts by weight | 122 |
| Comp. Exp. 5 | ally prop-2-ene-1-sulfonate 2 parts by weight | 102 |
| Comp. Exp. 6 | vinyl ethylene carbonate 2 parts by weight | 116 |
| Comp. Exp. 7 | None | 97 |

INDUSTRIAL APPLICABILITY

The electrolyte of the present invention may optimize the properties of an SEI layer formed on an anode surface, such as stability and lithium ion conductivity, and improve various characteristics of a battery, such as a lifetime characteristic, high temperature performance, etc.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A secondary battery comprising a cathode, an anode, and an electrolyte, wherein the electrolyte consists of:
   (i) $LiPF_6$ as an electrolyte salt;
   (ii) a mixed solvent of ethylene carbonate (EC) and diethyl carbonate (DEC) as an electrolyte solvent;
   (iii) 3-fluoro ethylene carbonate or 3,4-difluoro ethylene carbonate; and
   (iv) allyl prop-2-ene-1-sulfonate,
   wherein an active material of the anode is a carbonaceous material selected from the group consisting of graphite, carbon fiber, activated carbon and a mixture thereof.

2. The secondary battery of claim 1, wherein a concentration of the $LiPF_6$ in the electrolyte is 1M.

3. The secondary battery of claim 1, wherein a volume ratio of the EC to the DEC in the electrolyte is 3:7.

4. The secondary battery of claim 1, wherein the 3-fluoro ethylene carbonate is present an amount of 2 parts by weight based on 100 parts by weight of the electrolyte.

5. The secondary battery of claim 1, wherein the allyl prop-2-ene-1-sulfonate is present in an amount of 2 parts by weight based on 100 parts by weight of the electrolyte.

* * * * *